United States Patent
Kano et al.

(10) Patent No.: US 8,800,436 B2
(45) Date of Patent: Aug. 12, 2014

(54) DEVICE FOR HEATING FOOD MATERIAL

(75) Inventors: Tsutomu Kano, Fujimi (JP); Toshio Wakamatsu, Yao (JP); Masateru Yamashita, Kawasaki (JP)

(73) Assignee: Nepuree Corporation (JP)

( * ) Notice: Subject to any disclaimer, the term of this patent is extended or adjusted under 35 U.S.C. 154(b) by 241 days.

(21) Appl. No.: 13/007,836

(22) Filed: Jan. 17, 2011

(65) Prior Publication Data

US 2011/0177221 A1   Jul. 21, 2011

(30) Foreign Application Priority Data

Jan. 19, 2010   (JP) ................. 2010-008693

(51) Int. Cl.
*A47J 27/04*   (2006.01)

(52) U.S. Cl.
USPC .............. 99/443 C; 99/473; 99/474; 99/477; 99/516

(58) Field of Classification Search
CPC ................................. A47J 27/04; A23L 3/185
USPC ............ 426/511, 510, 520; 99/467, 473–475, 99/477, 443 C, 443 R, 516
See application file for complete search history.

(56) References Cited

U.S. PATENT DOCUMENTS

| | | | | |
|---|---|---|---|---|
| 1,992,398 | A * | 2/1935 | Ryder | 426/482 |
| 4,484,561 | A * | 11/1984 | Baggott et al. | 126/21 A |
| 5,410,951 | A * | 5/1995 | Ledet et al. | 99/443 C |
| 6,572,911 | B1 * | 6/2003 | Corcoran et al. | 426/510 |

FOREIGN PATENT DOCUMENTS

| | | | | |
|---|---|---|---|---|
| GB | 2396546 A | * | 6/2004 | A23L 3/18 |
| JP | 2009201502 A | * | 9/2009 | A23L 3/04 |

OTHER PUBLICATIONS

English translation JP2009201502; Enami et al.; 22 pgs.; Jan. 10, 2009.*
English Translation JP2009201502; pp. 1-8; Sep. 10, 2009.*
"Maillard reaction", Wikipedia, Jan. 11, 2011, http://en.wikipedia.org/wiki/Maillard_reaction, 4 pgs.

* cited by examiner

*Primary Examiner* — Steven Leff
(74) *Attorney, Agent, or Firm* — Wood, Phillips, Katz, Clark & Mortimer

(57) ABSTRACT

A heating device of a food material that can heat a food material while preventing oxidation reaction and the like of the food material as much as possible is provided. A food material 8 is held under a reductive atmosphere where air is eliminated by filling superheated steam in a heating chamber 10 at a pressure exceeding an atmospheric pressure. Thus, because the food material 8 is heated under the reductive atmosphere where air is eliminated by filling the superheated steam, not under a conventional atmosphere where oxygen and nitrogen exist. Therefore, a Maillard reaction and an oxidation reaction can be suppressed, and a thermochemical reaction which could not be caused in the conventional heating method is caused in the food material 8. Thereby, it can be expected that the heated food material 8 acquires a characteristic which did not exist in the past, with less degradation.

4 Claims, 2 Drawing Sheets

DEVICE FOR HEATING FOOD MATERIAL

TECHNICAL FIELD

The present invention relates to a method and device for heating a food material that can heat the food material while preventing oxidation and the like of the food material as much as possible.

RELATED ART

Conventionally, food materials, such as fish and shellfishes, meat, vegetables, and fruits, are heated by techniques, such as broiling (or roasting), boiling, steaming, frying (or deep frying), and electromagnetic wave heating.

By these heating techniques, it is unavoidable that the food materials are heated in a state where the food materials are exposed to air. For example, in the cases of broiling (or roasting), electromagnetic wave heating and the like, the food materials are heated in the state where they exist in the air, and also in the case of steaming, the food materials are heated in a state where a lot of air exists in the atmosphere. Even in the case of boiling, an influence of underwater dissolved air is unavoidable, and also in the case of frying (or deep frying), an influence of air contained in batter cannot be avoided.

For this reason, ingredients which constitute the food material are added with heat while being exposed to oxygen and nitrogen during the heating. Therefore, deterioration of the ingredients by reacting with oxygen and nitrogen cannot be avoided more or less during the heating.

Such deterioration of the food materials by heating is a reaction which generates a brown substance (melanoidin) which can be seen when reduction sugar and an amino compound (amino acid, peptide, and protein) are heated, and is called the "Maillard reaction." This Maillard reaction is a process including very many elementary reactions, the whole picture thereof has not been yet solved fully. However, because melanoidin which is a brown pigment produced in the Maillard reaction is a mixture including various polymer compounds containing many oxygen and nitrogen, it is considered that the Maillard reaction involves oxygen and nitrogen which are main components of air.

Further, an oxidation reaction is also caused by heating in the atmosphere where air exists. Thus, it is known that oil and fats contained in foodstuffs are oxidized to produce peroxide.

By such a Maillard reaction, an oxidation reaction and the like, the food material is at least changed or deteriorated. Therefore, it appears to be a reality that these reactions affect the degradation and the like of the food material.

RELATED ART DOCUMENT

Nonpatent Document 1: Internet Encyclopedia Wikipedia, the section of "Maillard reaction."
hap://ja.wikipedia.org/wiki/
%E3%83%A1%E3%82%A4%E3%83%A9%E3%83%BC%E3%83%89%E5%8F%8D%E5%BF%9C

SUMMARY OF THE INVENTION

Problems to be Solved by the Invention

However, because the Maillard reaction and the like are reactions which progress over a long period of time also at an ambient temperature, the food materials cannot be heated as a matter of fact, while completely avoiding these reactions. On the other hand, if the food materials can be heated while suppressing the Maillard reaction and the oxidation reaction as much as possible, it is expectable in the food materials to acquire a characteristic which did not exist in the past.

The present invention is made in view of the above situation, and provides a method and device for heating a food material, which can heat the food material, while preventing an oxidation reaction and the like of the food material as much as possible.

Means for Solving Problem

In order to achieve the above objective, according to an aspect of the invention, a heating device of a food material is provided. The device includes a heating chamber for heating the food material, and a superheated steam introducing module for introducing superheated steam into the heating chamber. The device is configured so that the food material is held under a reductive atmosphere where air is eliminated by filling the superheated steam in the heating chamber at a pressure exceeding an atmospheric pressure.

According to another aspect of the invention, a method of heating a food material is provided, which includes holding a food material under a reductive atmosphere where air is eliminated by filling superheated steam in a heating chamber at a pressure exceeding an atmospheric pressure.

EFFECT OF THE INVENTION

In the above aspects of the invention, by filling the superheated steam in the heating chamber at the pressure exceeding the atmospheric pressure, the food material is held under the reductive atmosphere where air is eliminated. Therefore, without using the conventional atmosphere where oxygen and nitrogen exist, the food material can be heated under the reductive atmosphere where air is eliminated by filling the superheated steam. Thereby, the Maillard reaction and the oxidation reaction can be suppressed, and a thermochemical reaction, which could not be caused in the conventional heating method, can be caused in the food material. Therefore, it can be expected that the heated food material acquires a characteristic that did not exist in the past, with less degradation.

In the above aspects of the invention, a heat-retention shell may be arranged outside the heating chamber so as to form an exhaust duct outside the heating chamber. A first opening through which the food material is taken into and out of the heating chamber may communicate with the exhaust duct. Exhaust gas discharged from the first opening may be discharged via the exhaust duct, to keep the heat in the heating chamber by exhaust heat of the exhaust gas. In the case where the device is configured as described above, the heating chamber can keep the heat by using waste heat of the exhaust gas and, thus, a thermal efficiency of the device can be improved.

In the above aspects of the invention, a second opening through which the food material is taken into and out of the heating chamber may be formed in the heat-retention shell so as to correspond to the first opening. An inlet of the exhaust duct may be formed between the first opening and the second opening, to discharge via the exhaust duct, air introduced from the second opening, while inhibiting the air from being introduced into the heating chamber. In the case where the device is configured as described above, the food material can be heated certainly under the reductive atmosphere where air is eliminated, and the Maillard reaction and the oxidation reaction can be suppressed.

DESCRIPTION OF REFERENCE NUMERALS

1A Upper Case
1B Lower Case
2 Exhaust Pipe
3 Conveyor
4 Superheated Steam Generating Device
5 Blower
6A Upper Heat-Retention Shell
6B Lower Heat-Retention Shell
7A Superheated Steam Introducing Pipe
7B Superheated Steam Introducing Pipe
8 Food Material
9A Exhaust Duct
9B Exhaust Duct
10 Heating Chamber
11 Conveyor Case
12 Inlet Opening
12A Inlet Opening
13 Outlet Opening
13A Outlet Opening
14 Feed Pipe
15 Introducing Port

Best Mode For Carrying Out The Invention

Below, the best mode for carrying out the present invention is described.

Figure 1:
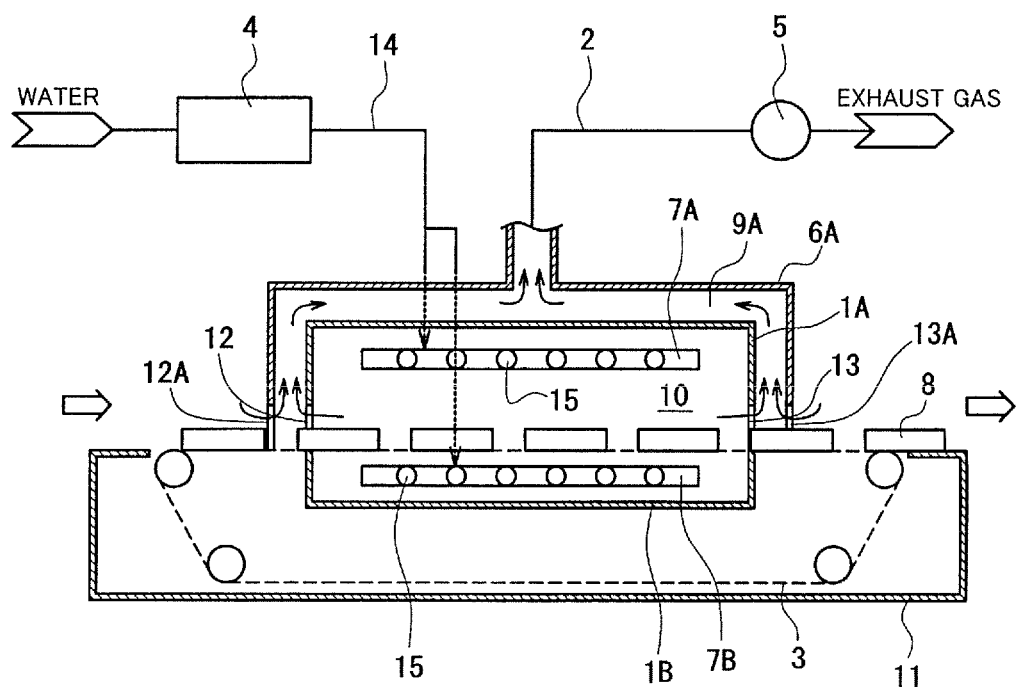
FIG. 1 is a view showing one embodiment of a heating device of a food material according to the present invention.

FIG. 1 is a view showing one embodiment of a heating device of a food material according to the present invention. A method of heating the food material according to the present invention can be realized by using this heating device.

This device includes a heating chamber 10 for heating a food material 8 which is an object to be heated and a superheated steam introducing module for introducing superheated steam into the heating chamber 10. The food material 8 is held under a reductive atmosphere where air is eliminated by filling the superheated steam in the heating chamber 10 at a pressure exceeding an atmospheric pressure.

Describing in more details, the device is provided with a conveyor 3 for conveying the food material 8. The conveyor 3 is provided over the heating chamber 10, extending from an inlet opening 12 to an outlet opening 13 of the heating chamber 10, and conveys the food material 8 placed thereon from the inlet side toward the outlet side within the heating chamber 10.

The heating chamber 10 is formed so as to be enclosed by an upper case 1A arranged above a conveying face of the conveyor 3 and a lower case 1B arranged below the conveying face of the conveyor 3. The inlet opening 12, through which the food material 8 placed on the conveying face of the conveyor 3 is carried into the heating chamber 10, is formed on the inlet side of the heating chamber 10 (left-hand side of the figure). The outlet opening 13, through which the food material 8 placed on the conveying face of the conveyor 3 out of the heating chamber 10 is taken out, is formed on the outlet side of the heating chamber 10 (right-hand side of the figure). A lower edge of the upper case 1A other than the inlet opening 12 and the outlet opening 13 extends to a position immediately above the conveying face of the conveyor 3.

In the heating chamber 10, superheated steam introducing pipes 7A and 7B for introducing the superheated steam, as a heat source, into the chamber are provided. As for the superheated steam introducing pipes 7A and 7B, the upper superheated steam introducing pipe 7A is arranged above the conveying face of the conveyor 3, and the lower superheated steam introducing pipe 7B is arranged below the conveying face of the conveyor 3. Two or more introducing ports 15 are formed in the upper and lower superheated steam introducing pipes 7A and 7B along a conveying direction of the conveyor 3, respectively, so that two or more food materials 8 arranged on the conveyor 3 in a line in the conveying direction can be heated.

A feed pipe 14 for supplying the superheated steam generated by a superheated steam generating device 4 is connected with the superheated steam introducing pipes 7A and 7B to introduce the superheated steam into the heating chamber 10 at the pressure exceeding the atmospheric pressure. That is, the superheated steam generating device 4, the feed pipe 14, and the superheated steam introducing pipes 7A and 7B function as the superheated steam introducing module of the aspect of the present invention.

In this example, a mesh conveyor is used as the conveyor 3 so that the superheated steam flows above and below the conveying face of the conveyor 3 (that is, the placing face for the food material 8) penetrating through the conveying face. Thereby, the food material 8 placed on the conveyor 3 can be uniformly heated entirely from above and below.

A portion of the conveyor 3 below the conveying face is covered with a conveyor case 11, and the conveyor 3 is driven and rotated in an interior space of the conveyor case 11. Thereby, the conveyor 3 which comes out from the heating chamber 10 rotates inside the interior space of the conveyor case 11, and enters into the heating chamber 10 again. The interior space of the conveyor case 11 functions as a heat-retention space of the conveyor 3, and the conveyor 3 which comes out from the heating chamber 10 enters into the heating chamber 10 again with the heat being kept to some extent and without being cooled so much, and, thereby, a reduction of the thermal efficiency is prevented.

An upper heat-retention shell 6A is provided outside the upper case 1A so that it covers the upper case 1A. An inlet opening 12A and an outlet opening 13A are formed in the upper heat-retention shell 6A, in portions corresponding to the inlet opening 12 and the outlet opening 13 of the heating chamber 10, respectively. A lower edge of the upper heat-retention shell 6A other than the inlet opening 12A and the outlet opening 13A extends to a position immediately above the conveying face of the conveyor 3. Therefore, the inlet opening 12 and the outlet opening 13 of the heating chamber 10 communicate with a space between the case 1A and the upper heat-retention shell 6A, respectively.

Further, an exhaust pipe 2 provided with a blower 5 is connected with a ceiling part of the upper heat-retention shell 6A to suck a gas inside the space between the upper case 1A and the upper heat-retention shell 6A and discharge it to the outside. Thereby, the space between the upper case 1A and the upper heat-retention shell 6A functions as an exhaust duct 9A. That is, an inlet of the exhaust duct 9A exists between the inlet opening 12 and the outlet opening 13 of the heating chamber 10, and the inlet opening 12A and the outlet opening 13A of upper heat-retention shell 6A.

Therefore, the superheated steam introduced into the heating chamber 10 at the pressure exceeding the atmospheric pressure is filled inside the heating chamber 10. After that, the steam is pushed out from the inlet opening 12 and the outlet opening 13 of the heating chamber 10 by the introducing pressure. Then, the stem is drawn into the exhaust duct 9A, passes through the exhaust duct 9A, and is discharged from the exhaust pipe 2 to the outside as exhaust gas.

The air caught from the inlet opening 12A and the outlet opening 13A of the upper heat-retention shell 6A, when carrying into and out of the food material 8 associated with an operation of the conveyor 3, is drawn into the exhaust duct 9A to be discharged as the exhaust gas. Therefore, it will not be introduced into the heating chamber 10 from the inlet opening 12 and the outlet opening 13 of the heating chamber 10.

Thus, the exhaust gas discharged from the inlet opening 12 and the outlet opening 13 of the heating chamber 10 passes through the exhaust duct 9A provided outside the upper case 6A which constitutes the heating chamber 10. Therefore, the heating chamber 10 can keep its heat by using the waste heat of the exhaust gas, and the thermal efficiency of the device can be improved.

In the above device, when the food material 8 which is an object to be heated is placed on the inlet side of the conveyor 3, it is conveyed toward the outlet side, and then carried into the heating chamber 10 from the inlet opening 12. The superheated steam is introduced into the heating chamber 10 from the superheated steam introducing pipes 7A and 7B. At this time, the superheated steam is introduced at the pressure exceeding the atmospheric pressure and, thus, the inside of the heating chamber 10 is always held at the pressure exceeding the atmospheric pressure during the operation. That is, even if a heat exchange exists between the food materials 8 which are carried in one after another from the inlet opening 12 and the superheated steam, the superheated steam is introduced at the pressure so that the inside of the heating chamber 10 is held at the pressure exceeding the atmospheric pressure.

Then, the food materials 8 are heated while advancing within the heating chamber 10 from the inlet opening 12 toward the outlet opening 13 by the drive of the conveyor 3. At this time, because the inside of the heating chamber 10 is held at the pressure exceeding the atmospheric pressure, the inside of the heating chamber 10 is filled only with the superheated steam, and, thereby, air will not enter into the heating chamber 10. Therefore, with the introduced superheated steam, the inside of the heating chamber 10 is held under the reductive atmosphere where air is eliminated, and the food materials 8 are held under this reductive atmosphere and heated.

Then, the superheated steam which fills the inside of the heating chamber 10 at the pressure exceeding the atmospheric pressure is pushed out from the inlet opening 12 and the outlet opening 13, is sucked into the exhaust duct 9A from the inlet thereof, passes through the exhaust duct 9A, and is discharged from the exhaust pipe 2.

Figure 2:
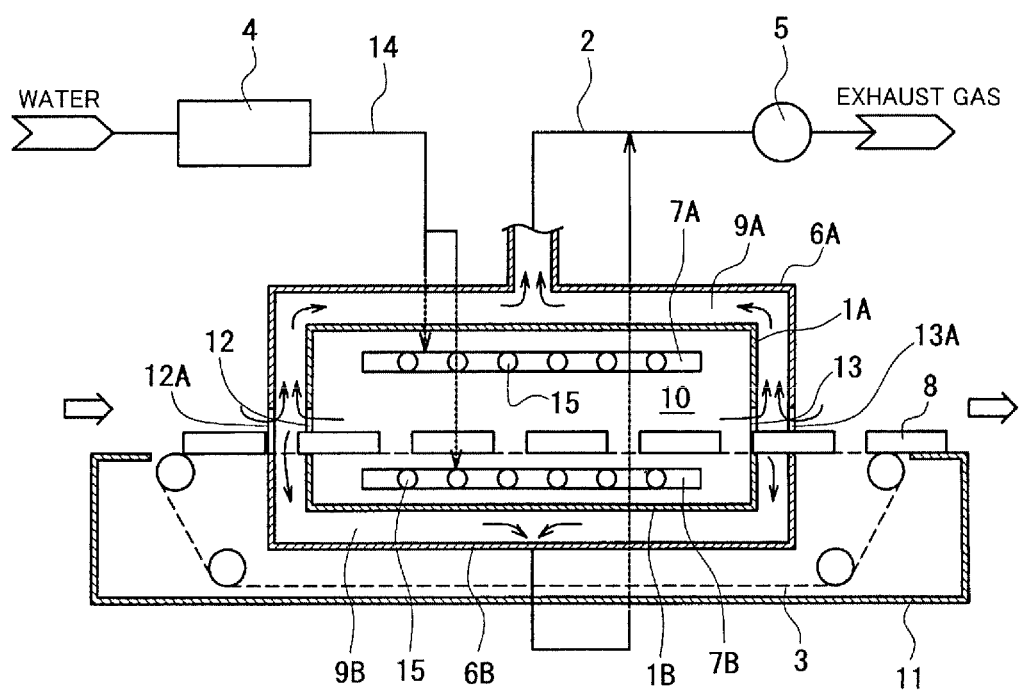
FIG. 2 is a view showing a second embodiment of the heating device of the food material according to the present invention.

FIG. 2 is a view showing a heating device of the food material according to a second embodiment of the present invention.

In this example, a lower heat-retention shell 6B is provided also the outside of the lower case 1B so that it covers the lower case 1B. The lower heat-retention shell 6B is not provided with openings corresponding to the inlet opening 12 and the outlet opening 13, and covers up to immediately below the conveying face of the conveyor 3.

The lower heat-retention shell 6B is connected with the exhaust pipe 2 provided with the blower 5, and sucks gas inside a space between the lower case 1B and the lower heat-retention shell 6B to discharge it to the outside. Thus, the space between the lower case 1B and the lower heat-retention shell 6B functions as an exhaust duct 9B. Therefore, the superheated steam pushed out by the introducing pressure from the inlet opening 12 and the outlet opening 13 of the heating chamber 10 is drawn into the exhaust duct 9A. Then, a part of the steam passes through the mesh conveyor 3, passes through the exhaust duct 9B, and is discharged to the outside from the exhaust pipe 2 as exhaust gas.

Thus, the exhaust gas discharged from the inlet opening 12 and the outlet opening 13 of the heating chamber 10 passes through the exhaust duct 9A provided outside of the upper case 6A which constitutes the heating chamber 10, and also passes through the exhaust duct 9B provided outside the lower case 6b. Therefore, the heating chamber 10 can keep its heat by using the waste heat of the exhaust gas, and, thereby, the thermal efficiency of the device can be improved.

Other than described above, it is similar to that of the previous embodiment and, thus, the same reference numerals are given to similar components. Similar operations and effects to the previous embodiment can be attained also in this example.

In the heating devices of the respective embodiments, the food materials 8 are held under the reductive atmosphere where air is eliminated by filling the superheated steam in the heating chamber 10 at the pressure exceeding the atmospheric pressure. Thus, the food materials 8 can be heated under the reductive atmosphere where air is eliminated by filling the superheated steam, not under an atmosphere where oxygen and nitrogen like the related art. Therefore, the Maillard reaction and oxidation reaction can be suppressed, and the thermochemical reaction which could not be caused in the conventional heating method can be caused in the food materials. Thereby, it can be expected that the heated food materials 8 acquire a characteristic which did not exist in the past, also with less degradation.

The heat-retention shells 6A and 6B are arranged outside the heating chamber 10 so that the exhaust ducts 9A and 9B are formed outside the heating chamber 10. The openings 12 and 13 through which the food materials 8 are taken into and out of the heating chamber 10 communicate with the exhaust ducts 9A and 9B. The exhaust gas discharged from the openings 12 and 13 is discharged via the exhaust ducts 9A and 9B. Thus, it is configured so that the heating chamber 10 keeps its heat by the exhaust heat of the exhaust gas. Therefore, the heating chamber 10 can keep the heat by using the waste heat of the exhaust gas, and the thermal efficiency of the device can be improved.

As described above, in the aspects of the invention, the food materials 8 are heated with the superheated steam.

The superheated steam used in the aspect of the invention is steam which will not be condensed and will not generate water drops by heat exchange and the like with the food material 8 carried into the heating chamber 10.

In this heating, a temperature of the superheated steam introduced into the heating chamber 10 can be suitably set according to various conditions, such as a kind of the food materials 8, a capacity of the heating chamber 10, a volume of the food materials carried into the heating chamber 10, and a conveying speed of the conveyor 3 (a loading amount of the food materials 8 per time). In any event, the temperature is set so that, the food materials 8 are well cooked and, thus, heat cooking and sterilization are appropriately performed in a state where the food materials 8 are continuously carried into the heating chamber 10, heated, and taken out of the heating chamber 10.

Further, a pressure of the superheated steam introduced into the heating chamber 10 can be suitably set according to various conditions, such as the capacity of the heating chamber 10, the volume of the food materials carried into the heating chamber 10, the conveying speed of the conveyor 3

(the loading amount of the food materials 8 per time). The pressure is set above a pressure at which air is not introduced into the heating chamber 1 from the inlet opening 12 and the outlet opening 13 in a state where the food materials 8 are continuously carried into the heating chamber 10, heated, and taken out of the heating chamber 10.

Further, a flow rate of the superheated steam introduced into the heating chamber 10 can be suitably set according to various conditions, such as the capacity of the heating chamber 10, the volume of the food materials carried into the heating chamber 10, the conveying speed of the conveyor 3 (the loading amount of the food materials 8 per time). The flow rate is set above a flow rate at which air is not introduced into the heating chamber 1 from the inlet opening 12 and the outlet opening 13 in the state where the food materials 8 are continuously carried into the heating chamber 10, heated, and taken out of the heating chamber 10.

INDUSTRIAL APPLICABILITY

The present invention is applicable for heating various kinds of food materials to cook, sterilize and the like the food material, such as vegetables, beans, potatoes, seaweed, mushrooms, fruits, meat, fish and shellfishes, and other processed food products.

The invention claimed is:

1. A heating device for a food material, comprising:
a heating chamber for heating the food material,
the heating chamber enclosed by a case comprising an upper case and a lower case;
a superheated steam introducing module for filling the heating chamber with superheated steam at a pressure exceeding atmospheric pressure;
a heat-retention shell arranged outside the heating chamber so as to form an exhaust duct outside the case;
an exhaust pipe in communication with the exhaust duct and provided with a blower;
a first inlet opening and a first outlet opening formed in the case and communicating with the exhaust duct;
a second inlet opening and second outlet opening formed in the heat-retention shell and communicating with the exhaust duct,
the food material taken into the heating chamber through the first and second inlet openings and taken out of the heating chamber through the first and second outlet openings;
a first exhaust duct inlet formed between the first and second inlet openings with a second exhaust duct inlet formed between the first and second outlet openings,
wherein the food material is held under a reductive atmosphere with air eliminated in the heating chamber by the superheated steam,
superheated steam discharging from the heating chamber through the first inlet opening and first outlet opening comprising an exhaust gas that passes through the exhaust duct outside the case so as to maintain heat in the heating chamber,
air introduced into the second inlet opening and second outlet opening moving toward the heating chamber drawn into the exhaust duct and thereby directed away from the first inlet and first outlet openings so as not to move into the heating chamber,
a conveyor for conveying food material through the first and second inlet openings, the heating chamber, and the first and second outlet openings,
the conveyor having a conveying face for supporting food material to be conveyed,
the lower case arranged below the conveying face of the conveyor,
the conveyor provided in the case that is in communication with the first and second exhaust duct inlets;
superheated steam introducing pipes for introducing the superheated steam, as a heat source, into the heating chamber,
the superheated steam introducing pipes comprising an upper superheated steam introducing pipe arranged above the conveying face of the conveyor and a lower superheated steam introducing pipe arranged below the conveying face of the conveyor; and
a lower heat-retention shell provided outside the lower case so that the lower heat-retention shell covers the lower case,
the lower heat-retention shell connected with the exhaust duct so that the blower sucks gas inside a space between the lower case and lower heat-retention shell to discharge the gas from inside the space.

2. The heating device of claim 1 wherein there are two or more introducing ports for each of the upper and lower superheated steam introducing pipes spaced along a conveying direction of the conveyor.

3. The heating device of claim 2 wherein the conveyor is made from a mesh material so that the superheated steam flowing from above and below the conveying face of the conveyor can penetrate through the conveying face.

4. The heating device of claim 1 wherein the lower heat-retention shell is configured to direct the exhaust gas discharging from the heating chamber into heat exchange relationship with the case.

* * * * *